United States Patent
Binette et al.

(10) Patent No.: US 9,610,477 B2
(45) Date of Patent: Apr. 4, 2017

(54) GOLF BALL INCORPORATING AT LEAST ONE LAYER FORMED FROM A MILLABLE POLYURETHANE RUBBER COMPOSITION

(71) Applicant: Acushnet Company, Fairhaven, MA (US)

(72) Inventors: Mark L. Binette, Mattapoisett, MA (US); Shawn Ricci, New Bedford, MA (US); Michael Michalewich, Norton, MA (US); Douglas S. Goguen, New Bedford, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/752,252

(22) Filed: Jun. 26, 2015

(65) Prior Publication Data
US 2016/0375313 A1 Dec. 29, 2016

(51) Int. Cl.
| | |
|---|---|
| A63B 37/12 | (2006.01) |
| C08F 283/00 | (2006.01) |
| C08G 18/86 | (2006.01) |
| A63B 37/00 | (2006.01) |
| A63B 45/00 | (2006.01) |

(52) U.S. Cl.
CPC ...... *A63B 37/0031* (2013.01); *A63B 37/0022* (2013.01); *A63B 37/0023* (2013.01); *A63B 37/0074* (2013.01); *A63B 37/0075* (2013.01); *A63B 37/0078* (2013.01); *A63B 37/0087* (2013.01); *A63B 37/0094* (2013.01); *A63B 45/00* (2013.01); *C08F 283/006* (2013.01); *C08G 18/86* (2013.01); *A63B 2037/0079* (2013.01)

(58) Field of Classification Search
None
See application file for complete search history.

(56) References Cited

U.S. PATENT DOCUMENTS

| | | | |
|---|---|---|---|
| 6,152,836 A | 11/2000 | Bradley et al. | |
| 6,203,450 B1 | 3/2001 | Bradley et al. | |
| 6,323,299 B1 | 11/2001 | Handlin et al. | |
| 6,638,185 B2 | 10/2003 | Kennedy, III et al. | |
| 6,793,593 B2 * | 9/2004 | Binette | A63B 37/0003 473/374 |
| 6,827,657 B2 | 12/2004 | Sullivan | |
| 6,945,879 B2 | 9/2005 | Simonutti et al. | |
| 7,066,839 B2 | 6/2006 | Sullivan | |
| 7,226,557 B2 | 6/2007 | Iwami et al. | |
| 7,320,649 B2 | 1/2008 | Rajagopalan et al. | |
| 7,628,715 B2 | 12/2009 | Yokota et al. | |
| 2007/0270242 A1 | 11/2007 | Keller et al. | |
| 2010/0331115 A1 * | 12/2010 | Shiga | A63B 37/0023 473/374 |

FOREIGN PATENT DOCUMENTS

JP 2003052854 * 2/2003

OTHER PUBLICATIONS

Thain, Science and Golf IV, (2002) pp. 319-327.*
Jablonski; Peroxide Curing of Millable Polyurethane; Rubber World (1999) 221(2); pp. 24,25,27,28-30,38.*

* cited by examiner

*Primary Examiner* — David Buttner
(74) *Attorney, Agent, or Firm* — Margaret C. Barker

(57) ABSTRACT

Golf ball comprising at least one layer having a Shore D material hardness of from about 10 to about 55 and consisting of a millable polyurethane rubber composition comprising rubber consisting of: at least one polyether-based millable polyurethane rubber; at least one polyester-based millable polyurethane rubber; at least one polycaprolactone-based millable polyurethane rubber; or combinations thereof; wherein the millable polyurethane rubber composition is vulcanized. The rubber may be mixed/compounded with additional non-rubber ingredients such as at least one cross linking agent, peroxide initiator, filler, antioxidant, processing agent, light stabilizer, colorant, adhesion promotor, isocyanate and/or polyol, or combinations thereof. The at least one layer may be a cover layer, with a second layer, formed from at least one of a thermoset urethane or a thermoplastic material, being adjacent to an inner surface of the cover layer and meanwhile disposed about a polybutadiene-containing core. The rubber may be peroxide and/or sulfur cured.

23 Claims, 4 Drawing Sheets

GOLF BALL INCORPORATING AT LEAST ONE LAYER FORMED FROM A MILLABLE POLYURETHANE RUBBER COMPOSITION

FIELD OF THE INVENTION

Golf balls delivering/displaying excellent shear and abrasion resistance without sacrificing desirable feel and control, and methods of making such golf balls.

BACKGROUND OF THE INVENTION

Golf balls are made in a variety of constructions and compositions. Generally, a core is surrounded by a cover, with at least one intermediate layer optionally disposed there between. Examples of conventional golf ball materials range from balata to polybutadiene, ionomer resins, polyurethanes, and/or polyureas. Typically, outer layers are formed about the spherical outer surface of an inner golf ball component via compression molding, casting, or injection molding.

Golf ball manufacturers continuously experiment with constructions and material formulations in order to target and improve aerodynamic and/or inertial properties and achieve desired feel without sacrificing durability. In this regard, thermoplastic ionomers and/or castable polyurethanes/ureas are popular cover materials, and ionomer blends are often used as casing materials. Balata, meanwhile, was popular at one point as providing desirable feel and control.

While each of these materials can impart desirable attributes to the cover, certain attendant limitations/drawbacks thereto are also known. For example, ionomer-based cover formulations can favorably impart excellent shear and abrasion resistance, but typically need to have a Shore D hardness greater than 60 to deliver those exceptional shear ratings. Unfortunately, such high cover hardnesses tend to lack the "feel" and "control" that many golfers desire—offering the golfer little in terms of delivering backspin with the short irons. Meanwhile, castable/injection moldable polyurethane/polyurea formulations can impart exceptional feel at lower hardnesses and exhibit excellent shear/abrasion resistance, but don't typically lend themselves to partial adjustment of the formulation during processing, for example, to change the cure package. And balata covered golf balls undesirably tend to exhibit poor shear/abrasion resistance and are expensive and difficult to produce.

One manufacturer blended conventional polybutadiene rubber with polyurethane rubber and optionally balata in relative amounts of 10-60% polybutadiene rubber, 10-90% polyether/polyester based millable polyurethane rubber, and 0-50% polyisoprene using a typical rubber making process. Golf balls were produced having a feel, resilience, flight properties and/or spin rate comparable to competitive polyurethane covered golf balls that differed therefrom with regard to the cover material as well as in other respects. See, U.S. Pat. No. 6,152,836 to Bradley et al. ("Bradley") at TABLES 1, 2 and 3 (Titleist Professional or Maxfli Revolution).

There is thus still a need for golf balls having layers/covers that can be interchanged with conventional polyurethane layer/cover materials without the need to otherwise modify the golf ball's construction and yet can be formed within a flexible process that permits partial adjustment of the layer/cover formulation during processing without including conventional polybutadiene rubber. The present inventive golf balls and methods of making such golf balls address and solve this need.

SUMMARY OF THE INVENTION

Accordingly, in one embodiment, a golf ball of the invention comprises at least one layer having a Shore D material hardness of from about 10 to about 55 and consisting of a millable polyurethane rubber composition comprising rubber consisting of: at least one polyether-based millable polyurethane rubber; at least one polyester-based millable polyurethane rubber; at least one polycaprolactone-based millable polyurethane rubber; or combinations thereof. The millable polyurethane rubber composition may be formed from a mixture of the rubber and additional non-rubber ingredients such as at least one cross linking agent, peroxide initiator, filler or combinations thereof. Additionally, the mixture may include ingredients including at least one antioxidant, processing agent, light stabilizer, colorant, adhesion promotor, or combinations thereof. The rubber may be compounded with these ingredients. In a particular embodiment, the rubber may be compounded with at least one isocyanate and/or at least one polyol.

In a preferred but non-limiting embodiment, the at least one layer is a cover layer. As demonstrated herein below in TABLE I, such a cover layer advantageously provides better durability than conventional polyurethane covered golf balls when the golf ball is struck by a club face without sacrificing the feel of a conventional polyurethane covered golf ball. It was highly unlikely and quite unexpected that a golf ball layer/cover formed solely from a millable polyurethane rubber composition could be interchangeable a with conventional polyurethane layer/cover on an otherwise identical golf ball and exhibit comparable, and in fact, slightly better shear resistance than the conventional polyurethanes material and without the known processing adjustment/modification limitation associated therewith.

In a particularly preferred embodiment, a second layer formed from at least one of a thermoset urethane or a thermoplastic material may be adjacent to an inner surface of the cover layer. And in one specific construction, the thermoplastic material consists of a partially or fully neutralized ionomer composition.

This second layer may be an inner cover layer, for example. The inner cover layer in one embodiment surrounds a core, which in a specific embodiment comprises a polybutadiene material. In another embodiment, the inner cover layer surrounds an intermediate layer that is disposed about a polybutadiene-containing core. The second layer may in other embodiments be an outer core layer disposed about an inner core.

The layer consisting of the millable polyurethane rubber composition may be vulvanized.

In one embodiment, a golf ball of the invention comprises a compression of from about 30 to about 110. Further, a golf ball of the invention may have a CoR of from about 0.700 to about 0.820.

A golf ball of the invention may be made by a method comprising the steps of: providing a subassembly comprising at least one layer; and forming a cover about the subassembly; wherein at least one of the at least one layer and the cover has a Shore D material hardness of from about 10 to about 55 and consists of a millable polyurethane rubber composition comprising rubber consisting of: at least one polyether-based polyurethane rubber; at least one polyester-based polyurethane rubber; at least one polycaprolactone-based millable polyurethane rubber; or combinations thereof. The method may further comprise forming an outermost layer of the subassembly adjacent an inner surface of the cover layer wherein the outermost layer is formed from at least one of a thermoset urethane or a thermoplastic material and the cover layer consists of the millable polyurethane rubber composition. In one embodiment, the thermoplastic material consists of a partially or fully neutralized ionomer composition.

Alternatively, the rubber may consist of a polybutadiene-diol based polyurethane rubber, wherein the polybutadiene is part of the backbone of the rubber composition. The polybutadiene may be part of the polyol-containing component. In this regard, an isocyanate/diisocyanate having an average NCO functionality in the range of about 1.8 to about 2.1 reacts with a polybutadiene diol composition as the polyol-containing component, wherein the polybutadiene diol composition can have a molecular weight of from about 2000 to about 5000 and an hydroxyl functionality of no greater than about 2.0.

The millable polyurethane rubber composition in golf balls of this invention may be desirably formed via conventional rubber making processes and the composition can be vulcanized.

BRIEF DESCRIPTION OF THE DRAWINGS

The accompanying drawings form a part of the specification and are to be read in conjunction therewith. The illustrated embodiments, however, are merely examples and are not intended to be limiting. Like reference numerals and designations in the various drawings indicate like elements.

DETAILED DESCRIPTION

Figure 1:
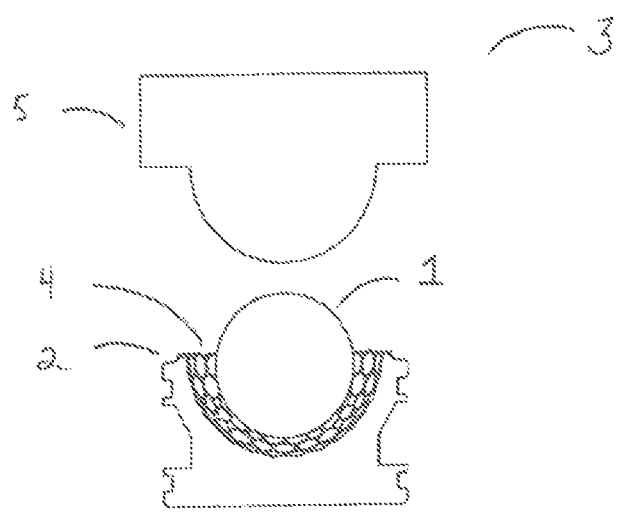
FIG. 1 is a side cross-section view of a conventional compression molding system.

A golf ball of the invention, incorporating at least one layer consisting of a millable polyurethane rubber composition, offers comparable if not better shear resistance (durability) than golf balls incorporating conventional castable polyurethane covers without sacrificing the desired feel attributable to typical polyurethane compositions. The millable polyurethane rubber composition advantageously incorporates rubber consisting of: at least one polyether-based millable polyurethane rubber; at least one polyester-based millable polyurethane rubber; at least one polycaprolactone-based millable polyurethane rubber; or combinations thereof. The terms "polyether-based", "polyester-based" and "polycaprolactone-based", as used herein, means that a diisocyanate is reacted with at least one polyether polyol and/or at least one polyester polyol and/or at least one polycaprolactone, along with many different possible available chain extenders, including for example chain extenders selected from the group consisting of amine-terminated chain extenders, hydroxyl-terminated chain extenders, and mixtures thereof.

Advantageously, the rubber may be combined with many typical additives and processing agents known in the golf art and be peroxide and/or sulfur cured in a fashion very similar to the way that conventional rubber compositions are formed into golf ball components. Such layers have a material hardness within the range of from about 10 Shore D to about 55 Shore D. In other embodiments, these layers may have material hardnesses of from about 10 Shore D to about 50 Shore D, or from about 20 Shore D to about 55 Shore D, or from about 30 Shore D to about 50 Shore D, or from about 35 Shore D to about 55 Shore D. Polyurethane rubbers are relatively high molecular weight compositions that are made from one or more isocyanates and equimolar or a stoichiometric excess of polyol. The polyol may be one of a polyether, polyester, polybutadiene, or some other hydroxyl terminated organic species. Conventional castable urethanes typically have a slight excess of isocyanate groups, making them totally different than the millable polyurethane rubber composition of at least one layer in a golf ball of the invention. In a golf ball of the invention, the urethane is under-indexed—that is, there is a stoichiometric deficiency of isocyanate groups compared to hydroxyl groups in the overall reaction, the ratio NCO:OH being 1.0 or slightly less.

The rubbers of a golf ball of the invention are comprised of hydroxyl terminated macromolecules which contain urethane linkages and are similar to more traditional prepolymers in that they are not fully reacted into a thermoset solid material. The rubbers contain some type of labile hydrogen which allows them to be crosslinked via a peroxide and/or sulfur cure mechanism. In some cases, the labile hydrogens are present through the grafting of vinyl groups onto the polymer chain. In other cases the labile hydrogens come from the methylene groups of the isocyanates such as MDI.

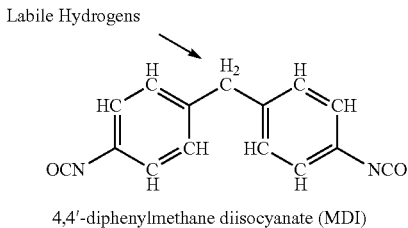

4,4'-diphenylmethane diisocyanate (MDI)

These urethane rubber materials can be compounded with peroxides and other materials such as fillers, density modifiers and/or other cross-linkable rubbers. When the rubbery/peroxide mixtures are molded and heated, the peroxide decomposes, producing two free radicals and allowing for croslinking of the rubbery urethane. This process is very similar to the traditional peroxide/butadiene rubber curing process. As such, the process and resulting polymer can be controlled via use of different peroxides, various organic or organometallic coagents, and other fillers. In a particular embodiment, the rubber may be compounded with at least one isocyanate and/or at least one polyol. When these rubber/isocyanate mixtures are molded and heated, the further added isocyanates will react with the hydroxyls from both the termini of the rubber chains as well as the added short chain polyols, forming a fully cross-linked polymer material. The hardness of the resulting material may be adjusted by using different isocyanates, different short chain polyols, and by adding more or less of said polyols.

In one embodiment, a slab of the polyurethane rubber is combined/mixed with other ingredients including for example peroxide and/or sulfur and milled together in a fashion similar to that used for making conventional rubbers such as polybutadiene.

The resulting millable polyurethane rubber composition can even be molded with dimples therein and used as a cover layer.

Figure 2:
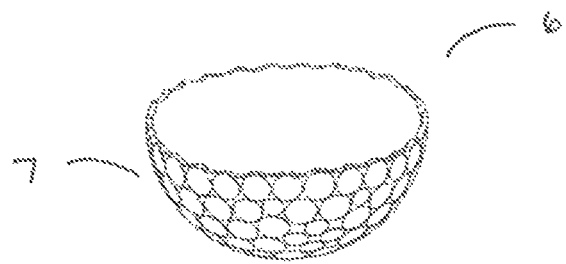
FIG. 2 is an elevated view of a polyurethane rubber shell.

FIG. 1 is a diagram of a traditional compression molding device for forming the millable polyurethane rubber composition into a cover layer half shell which can be used to make layers consisting of the millable polyurethane rubber composition. In this regard, a polyurethane rubber composition prep 1 may be added into mold cup 2 of compression molding system 3. Mold cup 2 includes a dimpled surface 4 such that when and pressure arm 5 is applied to or urged toward prep 1 and heat is added, prep 1 may be formed and crosslinked into a polyurethane rubber cover layer half shell 6 of FIG. 2 having a dimpled outer surface 7 formed by dimpled surface 4. Curing of cover layer half shell 6 can occur in some embodiments in less than about 6 minutes under high heat and pressure.

Upon demolding, the polyurethane rubber cover half shell 6 can then be secured in the mold cup 2 that formed it and placed into the urethane quad line process. The desired cover thickness of a resulting polyurethane rubber composition-containing layer can range, for example, from about 0.015" to about 0.090".

Figure 3:
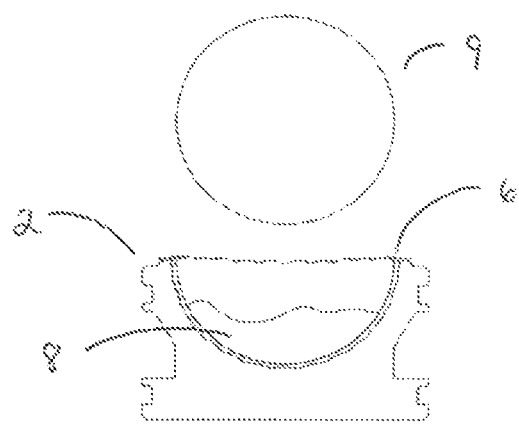
FIG. 3 is a side cross section view of a polybutadiene core to be centered into a mold containing a secured polyurethane rubber shell and urethane cast liquid that is dispensed within the polyurethane rubber shell.
Figure 4:
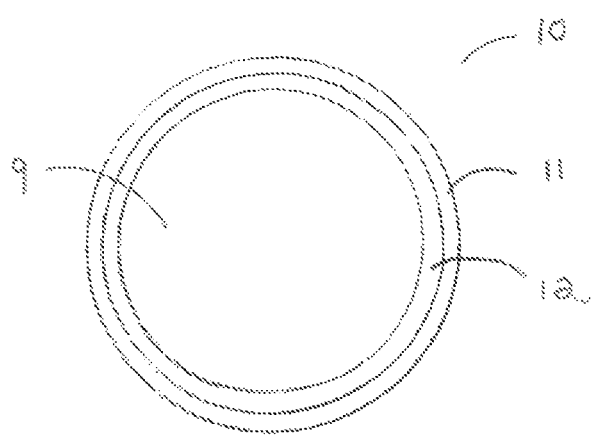
FIG. 4 is a cross-section view of a polyurethane rubber covered golf ball with a cast polyurethane casing that surrounds a conventional core.

In one embodiment, a castable casing or other intermediate layer formulation/liquid 8 can then be dispensed into the mold adjacent an inner surface of the secured the polyurethane rubber cover half shell 6 as depicted in FIG. 3. The conventional urethane casting process may ensue, centering a golf ball core 9 into mold cup 2 and assembling a second polyurethane rubber cover half shell 6 about golf ball core 9, later to form the end golf ball product; namely a finished golf ball 10 of FIG. 4 having polyurethane rubber composition cover 11 surrounding castable polyurethane casing layer 12, which is formed about core 9.

Attempting to over mold polyurethane rubber shell about an ionomer or other thermoplastic cased core can be difficult because of the great heat and pressure required to cure and knit the polyurethane rubber shell material to the casing, resulting in leakage of ionomer along the parting line of the mated shells and loss on concentricity of the casing layer. In contrast, the low pressures and temperatures used in the polyurethane casting process, along with the possibility of precise control of shot size reduces or eliminates this issue in golf balls of the invention in an embodiment wherein the casing layer is comprised of a conventional polyurethane material.

In one embodiment, a golf ball of the invention comprises a three layer cover comprised of a cross-linked polurethane rubber composition containing outer cover layer, a thin, cast polyurethane intermediate/binding layer, and a more conventional innermost casing layer comprising ionomer(s) or other thermoplastic resins over a conventional solid thermoset or thermoplastic core. Low heat and pressure may be used to prevent distortion of the innermost thermoplastic layer.

In another embodiment, an ultra thin outermost cover layer of uniform thickness (same thickness at land area and through dimples), may be formed from the polyurethane rubber composition, wherein the outer surface of the half shell is dimpled and the inner surface is brambled by using a dimpled male tool for forming the half shells. Here, ultra thin is defined as less than about 0.025", preferably less than about 0.020". Combined with dimpled golf ball precursors, each layer thickness could be of uniform thickness.

A self centering embodiment would combine a golf ball precursor having multiple protrusions (at least 3) for ensuring centering the precursor during the casting of the casing layer inside the half shell comprised of the polyurethane rubber composition.

The inventive cover stock may be compounded in a usual manner on a rubber mixing mill and extruded to form a long cylindrically shaped extrudate. The cylindrical column is then cut into slugs large enough to provide sufficient material to form a half shell for the ball. The slugs are molded into half shells by preheating the slugs and pressing them in a cold forming mold.

A core may then be enclosed in two inventive cover half shells consisting of the millable polyurethane rubber composition. The core enclosed in the two half shells is then placed in a preheated compression type molding press. The enclosed core can then be heated under pressure to mold the ball with a dimpled surface. The excess flash is then trimmed from the formed ball. Finally, the ball is washed and inspected. The molded ball may be vulcanized. This vulcanization step may be accomplished during the pressing operation or may be done thereafter. The purpose of vulcanization is to toughen the cover and achieve target properties.

Although these compounds are especially advantageous as cover layers since they exhibit the toughness that is often associated with ionomers, it is also envisioned that the millable polyurethane rubber composition may also or alternatively be used for one or more other golf ball layers. For example, the polyurethane rubber composition can be molded into spheres or thin layers for inner and outer cores.

TABLE I below demonstrates the benefits of a golf ball of the invention incorporating a cover consisting of a polyether-based millable polyurethane rubber composition and compared with a conventionally covered golf ball consisting of a typical polyurethane cover material. In this regard, 120 golf balls were produced for evaluation.

The 120 golf balls comprised 5 equal groups called Ex. 1, Ex. 2, Ex. 3, Ex. 4 and comparative Comp. Ex. 1, wherein each group differed with respect to cover material. Additionally, within each group, half of the 24 golf balls had painted covers, the paint being the same in all groups for each painted golf ball. All 120 golf balls were otherwise identical in construction.

In this regard, the golf ball cover formulations and several accompanying golf ball properties for the golf balls of groups Ex. 1, Ex. 2, Ex. 3, Ex. 4 and Comp. Ex. 1 are set forth in TABLE I below:

TABLE I

| Cover Formulation (phr)/ Properties | EXAMPLES | | | | |
|---|---|---|---|---|---|
| | Ex. 1 | Ex. 2 | Ex. 3 | Ex. 4 | Comp. Ex. 1 |
| Millathane ® 97[1] | 100 | — | — | — | — |
| Millathane ® 26[2] | — | 100 | — | — | — |
| Millathane ® CM[3] | — | — | 100 | — | — |
| Millathane ® E-34[4] | — | — | — | 100 | — |
| Urethane Elastomer[5] | — | — | — | — | 100 |
| SR ®525[6] | 35 | 37 | 25 | 27 | — |
| Dicumyl Peroxide | 1 | 1 | 1 | 1 | — |
| $TiO_2$ | 2 | 2 | 2 | 2 | |
| Ball | 76 | 74 | 77 | 74 | 75 |

TABLE I-continued

| Cover Formulation (phr)/ Properties | EXAMPLES | | | | |
|---|---|---|---|---|---|
| | Ex. 1 | Ex. 2 | Ex. 3 | Ex. 4 | Comp. Ex. 1 |
| Compression | | | | | |
| Cover Hardness (Shore C) | 85 | 84 | 87 | 83 | 75 |
| Cover Hardness (Shore D) | 49 | 48 | 52 | 48 | 52 |
| CoR @ 125 ft/sec | 0.776 | 0.779 | 0.775 | 0.781 | 0.783 |

[1] Millathane ®97 is a polyether millable urethane rubber (peroxide-curable only) available from TSE Industries, Inc.
[2] Millathane ®26 is a polyether millable urethane rubber (peroxide-curable only) available from TSE Industries, Inc.
[3] Millathane ®CM is a polyether millable urethane rubber (sulfur or peroxide-curable) available from TSE Industries, Inc.
[4] Millathane ®E-34 is a polyether millable urethane rubber (sulfur peroxide-curable) available from TSE Industries, Inc.
[5] Prepared by reacting 1.05 equivalents of an NCO terminated prepolymer (prepared through a reaction of 4,4 MDI and PTMEG 2000), with 1.0 equivalents of a curative blend consisting Ethacure 300 and a white dispersion.
[6] SR ®525 is N,N'-m-Phenylenedimaleimide (PDM), available from Sartomer.

As shown in TABLE I, the golf balls in groups Ex. 1, Ex. 2, Ex. 3, and Ex. 4 each comprised a cover consisting of one of four different polyether-based millable polyurethane rubber compositions. Specifically, the golf balls of group Ex. 1 incorporated a cover consisting of Millathane® 97, SR®525 N, N'-m-Phenylenedimaleimide (PDM), Dicumyl Peroxide, and TiO$_2$ in relative amounts of 100 phr, 35 phr, 1 phr, and 2 phr, respectively. The golf balls of group Ex. 2 meanwhile incorporated a cover consisting of Millathane®26, SR®525 N,N'-m-Phenylenedimaleimide (PDM), Dicumyl Peroxide, and TiO$_2$ in relative amounts of 100 phr, 37 phr, 1 phr, and 2 phr, respectively. In turn, the golf balls of group Ex. 3 incorporated a cover consisting of Millathane®CM, SR®525 N,N'-m-Phenylenedimaleimide (PDM), Dicumyl Peroxide, and TiO$_2$ in relative amounts of 100 phr, 25 phr, 1 phr, and 2 phr, respectively. Finally, the golf balls of group Ex. 4 incorporated a cover consisting of Millathane®E-34, SR®525 N,N'-m-Phenylenedimaleimide (PDM), Dicumyl Peroxide, and TiO$_2$ in relative amounts of 100 phr, 27 phr, 1 phr, and 2 phr, respectively.

In contrast, the covers of each golf ball in comparative group Comp. Ex. 1 consisted of a conventional polyurethane material formed by reacting 1.05 equivalents of an NCO terminated prepolymer, prepared through a reaction of 4,4 MDI and PTMEG 2000, with 1.0 equivalents of a curative blend consisting Ethacure®300 and a white dispersion.

Referring to the properties of inventive golf balls of groups Ex. 1, Ex. 2, Ex. 3, Ex. 4 and comparative Comp. Ex. 1 reported in TABLE I, the compressions were quite similarly 76, 74, 77, 74 and 75, respectively. Likewise, the COR's of the golf balls in groups Ex. 1, Ex. 2, Ex. 3, and Ex. 4 differed from the COR of comparative golf balls in group Comp. Ex. 1 by at most 0.008 points. Golf balls Ex. 1, Ex. 2, Ex. 3, and Ex. 4 had Shore D cover hardnesses of from 48-52—desirably about the same as or slightly less than the Shore D cover hardness of golf ball Comp. Ex. 1. The golf balls of group Comp. Ex. 1 did have a cover Shore C hardness at least 8 Shore C hardness points greater than that of golf balls Ex. 1, Ex. 2, Ex. 3, and Ex. 4 (which ranged from 83 to 87).

Meanwhile, all 120 golf balls were subjected to shear resistance testing. Shear resistance is a golf ball's ability to withstand the shear force applied to a ball when hit with a golf club and/or iron. When the grooves on the striking surface of a golf club and/or iron impact a golf ball in a downward oblique swing causing it to slide upward across the face, and immediately forcibly propelled in an outbound trajectory from, the particular club face, the shear force applied to the golf ball cover often produces cuts or abrasion marks on the surface of the cover material of the golf ball. The shear resistance of each golf ball may be evaluated by any procedure known in the art for evaluating durability. For example, low handicap golfers can be used to repeatedly hit a golf ball upon which any damage to the cover is evaluated and rated.

For the golf balls in each of groups Ex. 1, Ex. 2, Ex. 3, Ex. 4 and comparative group Comp. Ex. 1, 12 molded (non-painted) and 12 painted golf balls were tested for shear resistance and their respective shear resistances ranked according to the following criteria set forth in TABLE II (non-painted golf balls) and TABLE III (painted golf balls):

TABLE II

Shear Resistance Criteria for Non-painted Golf Ball

| Ranking | Observation |
|---|---|
| 1 | Portion of cover torn or cracked so that the underlying layer can be exposed |
| 2 | Dimples or other surface geometry in the cover have been reduced or greatly removed |
| 3 | Grooved/channel flaps evident in the cover surface made by club grooves/channels |
| 3.5 | Cuts by club grooves/channels are evident but not sufficient to create a flap |
| 4 | Club groove/channel marks evident in cover material not limited to frets but no apparent deformation of the cover material |
| 4.5 | Club groove/channel marks evident in cover material that is limited to frets but no apparent deformation of the cover material |
| 5 | Club groove/channel marks are difficult to see in the cover surface |

As is described in each of TABLES II and III, ranking progresses from a rating of 1, or least shear resistant, to 5, or most shear resistant, based on observations spanning from visual recognition of actual removal of cover material/paint to barely noticeable marks made by club grooves/channels. In between these observations, other observations included seeing flaps in the cover material due to cuts by the club, observing cuts without flaps in the cover, to varying degrees of club groove/channel marks on the golf ball surface without any cuts/deformation being visually evident.

TABLE III

Shear Resistance Criteria for Painted Golf Ball

| Ranking | Observation |
|---|---|
| 1 | Paint removed and portion of cover torn or cracked so that the underlying layer can be exposed |
| 2 | Paint removed and dimples or other surface geometry in the cover reduced or greatly removed |
| 3 | Paint removed, and grooved flaps made by club grooves/channels are evident in the cover surface |
| 3.5 | Paint and cover have been cut by club grooves/channels and are evident but cuts not sufficient to create a flap |
| 4 | Dime sized paint removal not limited to frets with club grooves/channels evident in cover material without apparent deformation of the cover material |
| 4.5 | Paint removal local only to fret area; with club grooves/channels evident in cover material without apparent deformation of the cover material |
| 5 | No paint removal and groove/channel marks are difficult to see in the cover |

TABLE IV below reports for each of groups Ex. 1, Ex. 2, Ex. 3, Ex. 4 and comparative group Comp. Ex. 1 an average of the rankings made for the 12 painted golf balls and the 12 non-painted golf balls of each group:

TABLE IV

| Method of Testing Durability | Ex. 1 | Ex. 2 | Ex. 3 | Ex. 4 | Comp. Ex. 1 |
|---|---|---|---|---|---|
| Average Molded Ball Shear Rating | 4.0 | 4.5 | 3.5 | 3.5 | 3.3 |
| Average Painted Ball Shear Rating | 4.3 | 4.5 | Not Tested | 4.1 | 3.8 |

TABLE IV reveals that for inventive golf balls of groups Ex. 1, Ex. 2, Ex. 3, and Ex. 4, the average ranking for the molded golf balls was at least 3.5, meaning that, on average, any cuts made in golf balls during the shear testing thereof were not sufficient to create a flap. In contrast, the molded golf balls of comparative golf ball group Comp. Ex. 1 received an average ranking below 3.5—meaning that, on average, the comparative molded golf balls had cuts sufficient to create a flap in the cover surface.

Meanwhile, the painted golf balls of inventive golf ball groups Ex. 1, Ex. 2, Ex. 3, and Ex. 4 received average rankings of at least 4.1, meaning that, on average, club grooves/channels, were at most evident in the cover material without apparent deformation, whereas in comparative golf balls of group Comp. Ex. 1, the average ranking was 3.8, meaning that on average, paint and cover had actually been cut by club, albeit not sufficient to form a flap.

Thus, TABLE IV demonstrates that inventive golf balls of groups Ex. 1, Ex. 2, Ex. 3, and Ex. 4 having covers consisting of a millable polyurethane rubber composition advantageously received on average higher/better shear ratings compared with conventionally polyurethane covered golf balls of group Comp. Ex. 1 in both the molded and painted golf ball versions. Accordingly, golf balls of the invention incorporating a layer that is formed from a millable urethane rubber composition, has the aforementioned processing benefits yet provides the player with comparable if not better shear resistance without sacrificing feel and control. Such golf balls have layers/covers that are clearly interchangeable with conventional polyurethane layer/cover materials without the need to otherwise change golf ball construction and yet can be formed within a flexible process that permits partial adjustment of the formulation during processing without including conventional polybutadiene rubber.

Golf balls of this invention may additionally incorporate other golf ball layers that are comprised of conventional golf ball layer compositions—for example, ionomers, polyurethanes, polyureas, TPE, HNP, crosslinked rubber, etc., or blends/mixtures/combinations thereof. Suitable layer compositions are disclosed, for example, in U.S. Pat. Nos. 6,953,820 and 6,939,907, and U.S. Pat. Nos. 5,919,100, 6,653,382, 6,872,774, 7,074,137, and 7,300,364, the entire disclosures of which are hereby incorporated herein by reference.

Suitable rubber compositions include a base rubber selected from natural and synthetic rubbers, including, but not limited to, polybutadiene, polyisoprene, ethylene propylene rubber ("EPR"), ethylene propylene diene rubber ("EPDM"), styrene butadiene rubber, styrenic block copolymer rubber, butyl rubber, halobutyl rubber, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polystyrene elastomers, polyethylene elastomers, polyurethane elastomers, polyurea elastomers, metallocene-catalyzed elastomers and plastomers, polyalkenamer, phenol formaldehyde, melamine formaldehyde, polyepoxide, polysiloxane, alkyd, polyisocyanurate, polycyanurate, polyacrylate, and combinations of two or more thereof. Diene rubbers are preferred, particularly polybutadiene, styrene butadiene, acrylonitrile butadiene, and mixtures of polybutadiene with other elastomers wherein the amount of polybutadiene present greater than 40 wt % based on the total polymeric weight of the mixture.

Non-limiting examples of suitable commercially available base rubbers are Buna CB high-cis neodymium-catalyzed polybutadiene rubbers, such as Buna CB 23, Buna CB24, and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Plioflex PLF 1502, commercially available from Goodyear Chemical; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical. In a particular embodiment, the core is formed from a rubber composition comprising as the base rubber a blend of Neodene BR 40 polybutadiene, Budene® 1207 polybutadiene, and Buna SB 1502 styrene butadiene rubber. In another particular embodiment, the core is formed from a rubber composition comprising as the base rubber a blend of Neodene BR 40 polybutadiene, Buna CB 1221, and core regrind.

The rubber is crosslinked using, for example, a peroxide or sulfur cure system, C—C initiators, high energy radiation sources capable of generating free radicals, or a combination thereof. The rubber composition optionally includes one or more of the following: scorch retarder, antioxidant, soft and fast agent, filler, processing aid, processing oil, coloring agent, fluorescent agent, chemical blowing and foaming agent, defoaming agent, stabilizer, softening agent, impact modifier, free radical scavenger, and antiozonant (e.g., p-phenylenediames). Suitable types and amounts of rubber, initiator agent, coagent, filler, and additives are more fully described in, for example, U.S. Pat. Nos. 6,566,483, 6,695, 718, 6,939,907, 7,041,721 and 7,138,460, the entire disclosures of which are hereby incorporated herein by reference. Particularly suitable diene rubber compositions are further disclosed, for example, in U.S. Pat. No. 7,654,918, the entire disclosure of which is hereby incorporated herein by reference.

Suitable ionomer compositions include partially neutralized ionomers and highly neutralized ionomers, including ionomers formed from blends of two or more partially neutralized ionomers, blends of two or more highly neutralized ionomers, and blends of one or more partially neutralized ionomers with one or more highly neutralized ionomers. Preferred ionomers are salts of O/X— and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. As used herein, "(meth) acrylic acid" means methacrylic acid and/or acrylic acid. Likewise, "(meth) acrylate" means methacrylate and/or acrylate. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Particularly preferred O/X/Y-type copolymers are ethylene/(meth) acrylic acid/n-butyl (meth) acrylate, ethylene/(meth) acrylic acid/isobutyl (meth) acrylate, ethylene/(meth) acrylic acid/methyl (meth) acrylate, and ethylene/(meth) acrylic acid/ethyl (meth) acrylate. The acid is typically present in the acid copolymer in an amount of 6 wt % or greater, or 9 wt % or greater, or 10 wt % or greater, or 11 wt % or greater, or 15 wt % or greater, or 16 wt % or greater, or 19 wt % or greater, or 20 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The acid copolymer is at least partially neutralized with a cation source, optionally in the presence of a high molecular weight organic acid, such as those disclosed in U.S. Patent No. 6,756,436, the entire disclosure of which is hereby incorporated herein by reference. In a particular embodiment, less than 40% of the acid groups present in the composition are neutralized. In another particular embodiment, from 40% to 60% of the acid groups present in the composition are neutralized. In another particular embodiment, from 60% to 70% of the acid groups present in the composition are neutralized. In another particular embodiment, from 60% to 80% of the acid groups present in the composition are neutralized. In another particular embodiment, from 70% to 80% of the acid groups present in the composition are neutralized. In another embodiment, from 80% to 100% of the acid groups present in the composition are neutralized. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, tin, lithium, and rare earth metals. In a particular embodiment, the ionomer composition includes a bimodal ionomer, for example, DuPont® AD1043 ionomers, and the ionomers disclosed in U.S. Pat. No. 7,037, 967 and U.S. Pat. Nos. 6,562,906, 6,762,246 and 7,273,903, the entire disclosures of which are hereby incorporated herein by reference. Suitable ionomers are further disclosed, for example, in U.S. Pat. Nos. 5,587,430, 5,691, 418, 5,866,658, 6,100,321, 6,653,382, 6,756,436, 6,777,472, 6,815,480, 6,894,098, 6,919,393, 6,953,820, 6,994,638, 7,230,045, 7,375,151, 7,429,624, and 7,652,086, the entire disclosures of which are hereby incorporated herein by reference.

Suitable ionomer compositions also include blends of one or more partially- or fully-neutralized polymers with additional thermoplastic and thermoset materials, including, but not limited to, non-ionomeric acid copolymers, engineering thermoplastics, fatty acid/salt-based highly neutralized polymers, polybutadienes, polyurethanes, polyureas, polyesters, polyamides, polycarbonate/polyester blends, thermoplastic elastomers, maleic anhydride-grafted metallocene-catalyzed polymers (e.g., maleic anhydride-grafted metallocene-catalyzed polyethylene), and other conventional polymeric materials.

Suitable ionomeric compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Also suitable are polyester ionomers, including, but not limited to, those disclosed, for example, in U.S. Pat. Nos. 6,476,157 and 7,074,465, the entire disclosures of which are hereby incorporated herein by reference.

Also suitable are thermoplastic elastomers comprising a silicone ionomer, as disclosed, for example, in U.S. Pat. No. 8,329,156, the entire disclosure of which is hereby incorporated herein by reference.

Also suitable are the following non-ionomeric polymers, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like:

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001, 930, and 5,981,654, the entire disclosures of which are hereby incorporated herein by reference, and blends of two or more thereof;

(c) polyurethanes, polyureas, polyurethane-polyurea hybrids, and blends of two or more thereof;
(d) fluoropolymers, such as those disclosed in U.S. Pat. Nos. 5,691,066, 6,747,110 and 7,009,002, the entire disclosures of which are hereby incorporated herein by reference, and blends of two or more thereof;
(e) non-ionomeric acid polymers, such as E/X— and E/X/Y-type copolymers, wherein E is an olefin (e.g., ethylene), X is a carboxylic acid such as acrylic, methacrylic, crotonic, maleic, fumaric, or itaconic acid, and Y is an optional softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; and blends of two or more thereof;
(f) metallocene-catalyzed polymers, such as those disclosed in U.S. Pat. Nos. 6,274,669, 5,919,862, 5,981,654, and 5,703,166, the entire disclosures of which are hereby incorporated herein by reference, and blends of two or more thereof;
(g) polystyrenes, such as poly(styrene-co-maleic anhydride), acrylonitrile-butadiene-styrene, poly(styrene sulfonate), polyethylene styrene, and blends of two or more thereof;
(h) polypropylenes and polyethylenes, particularly grafted polypropylene and grafted polyethylenes that are modified with a functional group, such as maleic anhydride of sulfonate, and blends of two or more thereof;
(i) polyvinyl chlorides and grafted polyvinyl chlorides, and blends of two or more thereof;
(j) polyvinyl acetates, preferably having less than about 9% of vinyl acetate by weight, and blends of two or more thereof;
(k) polycarbonates, blends of polycarbonate/acrylonitrile-butadiene-styrene, blends of polycarbonate/polyurethane, blends of polycarbonate/polyester, and blends of two or more thereof;
(l) polyvinyl alcohols, and blends of two or more thereof;
(m) polyethers, such as polyarylene ethers, polyphenylene oxides, block copolymers of alkenyl aromatics with vinyl aromatics and poly(amic ester)s, and blends of two or more thereof;
(n) polyimides, polyetherketones, polyamideimides, and blends of two or more thereof;
(o) polycarbonate/polyester copolymers and blends; and
(p) combinations of any two or more of the above thermoplastic polymers.

Examples of commercially available thermoplastics suitable for forming thermoplastic layers include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000, HPF 2000, HPF AD 1035, HPF AD 1040, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

Suitable plasticized polymer compositions include a plasticizer in an amount sufficient to substantially change the stiffness and/or hardness of the composition, and typically comprise from 20 to 99.5 wt % of the polymer and from 0.5 to 80 wt % of the plasticizer, based on the combined weight of the polymer and the plasticizer. In a particular embodiment, the plasticizer is present in an amount of 0.5% or 1% or 3% or 5% or 7% or 8% or 9% or 10% or 12% or 15% or 18% or 20% or 22% or 25% or 30% or 35% or 40% or 42% or 50% or 55% or 60% or 66% or 71% or 75% or 80%, by weight based on the combined weight of the polymer and the plasticizer, or the plasticizer is present in an amount within a range having a lower limit and an upper limit selected from these values. Suitable polymers include acid copolymers, partially neutralized acid copolymers, highly neutralized acid polymers ("HNPs"), polyesters, polyamides, thermosetting and thermoplastic polyurethanes.

Suitable plasticized acid copolymer compositions, plasticized partially neutralized acid copolymer compositions, and plasticized HNP compositions, and particularly suitable golf ball constructions utilizing such compositions, are further disclosed, for example, in U.S. Patent Application Publ. No. 2015/0031475, U.S. Patent Application Publ. No. 2015/0005108, U.S. patent application Ser. Nos. 14/576,800, and 14/588,317, the entire disclosures of which are hereby incorporated herein by reference.

Suitable plasticized polyester compositions, and particularly suitable golf ball constructions utilizing such compositions, are further disclosed, for example, in U.S. patent application Ser. No. 14/532,141, the entire disclosure of which is hereby incorporated herein by reference.

Suitable plasticized polyamide compositions, and particularly suitable golf ball constructions utilizing such compositions, are further disclosed, for example, in U.S. Patent Application Publ. No. 2014/0302947, U.S. Patent Application Publ. No. 2014/0323243, U.S. Patent Application Publ. No. 20150057105, and U.S. patent application Ser. No. 14/576,324, the entire disclosures of which are hereby incorporated herein by reference.

Suitable plasticized polyurethane compositions, and particularly suitable golf ball constructions utilizing such compositions, are further disclosed, for example, in U.S. patent application Ser. Nos. 14/672,538, 14/672,523, Ser. No. 14/672,485, and 14/691,720, the entire disclosures of which are hereby incorporated herein by reference. Further suitable plasticized compositions include for example those disclosed in U.S. patent application Ser. Nos. 14/571,610, 14/576,324, and 14/707,028.

And it is contemplated that a golf ball of the invention may have any known construction and have any number of layers with any known properties. In one non-limiting example, a golf ball of the invention may comprise a single core having a diameter of from about 1.20 in. to about 1.65 in. Alternatively, the core may have a dual core arrangement having a total diameter of from about 1.40 in. to about 1.65 in, for example, wherein the inner core may has a diameter of from about .75 inches to about 1.30 in. and the outer core has a thickness of from about 0.05 in. to about 0.45 in. Cover thicknesses generally range from about 0.015 in. to about 0.090 inches, although a golf ball of the invention may comprise any known thickness. Meanwhile, casing layers and inner cover layers each typically have thicknesses ranging from about 0.01 in. to about 0.06 in. A golf ball of the invention may also have one or more film layers, paint layers or coating layers having a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

A golf ball of the invention may further incorporate indicia, which as used herein, is considered to mean any symbol, letter, group of letters, design, or the like, that can be added to the dimpled surface of a golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient. And the cover hardness may be targeted depending on desired playing characteristics. As a general rule, all other things being equal, a golf ball having a relatively soft cover will spin more than a similarly constructed ball having a harder cover.

In the present invention, compression and CoR may also be tailored to suit desired playing characteristics. In this regard, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton, *Compression by Any Other Name, Science and Golf IV, Proceedings of the World Scientific Congress of Golf* (Eric Thain ed., Routledge, 2002) ("J. Dalton").

In a golf ball if the invention, Coefficient of Restitution or COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. COR is then calculated as the ratio of the outgoing transit time period to the incoming transit time period, $COR=V_{out}/V_{in}=T_{in}/T_{out}$. The COR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

It is understood that the golf balls of the invention incorporating at least one treated surface as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims

What is claimed is:

1. A golf ball comprising at least one layer having a Shore C hardness of greater than 75 and consisting of a millable polyurethane rubber composition comprising a mixture of: (i) at least one millable urethane rubber consisting of: at least one polyether-based polyurethane rubber; at least one polyester-based polyurethane rubber; at least one polycaprolactone-based millable polyurethane rubber; or combinations thereof; (ii) at least one peroxide initiator; and (iii) N, N-m-Phenylenedimaleimide in an amount of at least about 25 parts per 100 parts of the millable urethane rubber;
wherein the millable polyurethane rubber composition is vulcanized; and
wherein the golf ball has CoR of at least about 0.700.

2. The golf ball of claim 1, wherein the at least one layer is a cover layer.

3. The golf ball of claim 2, wherein the rubber is a polyether-based polyurethane rubber.

4. The golf ball of claim 1, wherein the mixture further comprises at least one antioxidant, processing agent, light stabilizer, colorant, adhesion promotor, cross linking agent, filler, or combinations thereof.

5. The golf ball of claim 1, further comprising a second layer that is formed from at least one of a thermoset urethane or a thermoplastic material and is adjacent to an inner surface of the cover layer.

6. The golf ball of claim 5, wherein the thermoplastic material consists of a partially or fully neutralized ionomer composition.

7. The golf ball of claim 5, wherein the second layer is an inner cover layer.

8. The golf ball of claim 7, wherein the inner cover layer surrounds a core.

9. The golf ball of claim 7, wherein the inner cover layer surrounds a third layer that is disposed about a polybutadiene-containing core.

10. The golf ball of claim 5, wherein the second layer is an outer core layer disposed about an inner core layer comprising polybutadiene.

11. The golf ball of claim 1, having a compression of from about 30 to about 110.

12. The golf ball of claim 11, having a CoR of from about 0.700 to about 0.820.

13. The golf ball of claim 1, wherein the amount of N, N-m-Phenylenedimaleimide is from about 25 to about 37 parts per 100 parts of the millable urethane rubber.

14. The golf ball of claim 1, wherein the Shore C hardness is at least about 83.

15. A method of making a golf ball, comprising the steps of:

providing a subassembly comprising at least one layer;
forming a cover layer about the subassembly;
wherein at least one of the at least one layer and the cover layer has a Shore C hardness of greater than 75 and consists of a millable polyurethane rubber composition comprising a mixture of: (i) at least one millable urethane rubber consisting of: at least one polyether-based polyurethane rubber; at least one polyester-based polyurethane rubber; at least one polycaprolactone-based millable polyurethane rubber; or combinations thereof; (ii) at least one peroxide initiator; and (iii) N, N-m-Phenylenedimaleimide in an amount of at least about 25 parts per 100 parts of the millable urethane rubber; and
wherein the millable polyurethane rubber composition is exposed to a vulcanizing agent; and
wherein the golf ball has CoR of at least about 0.700.

16. The method of claim 15, wherein the at least one layer is a cover layer.

17. The method of claim 16, wherein the rubber consists of at least one polyether-based polyurethane rubber.

18. The method of claim 15, wherein the mixture further comprises at least one ingredient selected from cross linking agents; antioxidants; processing agents; light stabilizers; colorants; or adhesion promotors; isocyanates, polyols; fillers; or combinations thereof.

19. The method of claim 18, wherein the rubber is compounded with the at least one ingredient.

20. The method of claim 15, further comprising forming an outermost layer of the subassembly adjacent an inner surface of the cover layer wherein the outermost layer is formed from at least one of a thermoset urethane or a thermoplastic material.

21. The method of claim 20, wherein the thermoplastic material consists of a partially or fully neutralized ionomer composition.

22. The method of claim 15, wherein the amount of N, N-m-Phenylenedimaleimide is from about 25 to about 37 parts per 100 parts of the millable urethane rubber.

23. The method of claim 15, wherein the Shore C hardness is at least about 83.

* * * * *